L. S. WATRES.
MEANS FOR DETERMINING THE WEIGHT OF FUEL CARRIED BY A LOCOMOTIVE TENDER.
APPLICATION FILED NOV. 7, 1913.
1,136,634.
Patented Apr. 20, 1915.
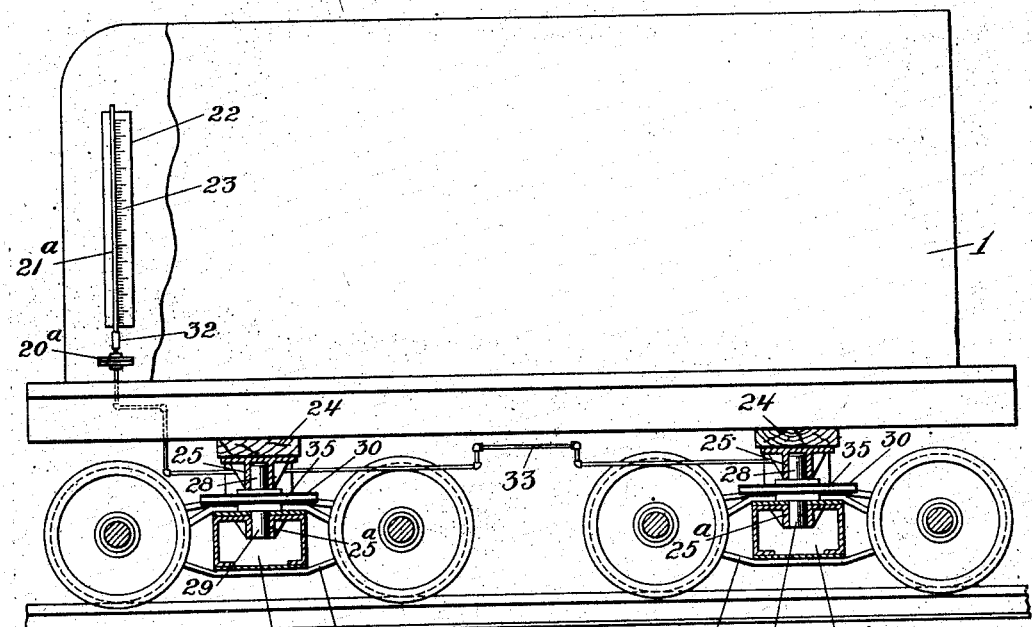
Fig. 1.
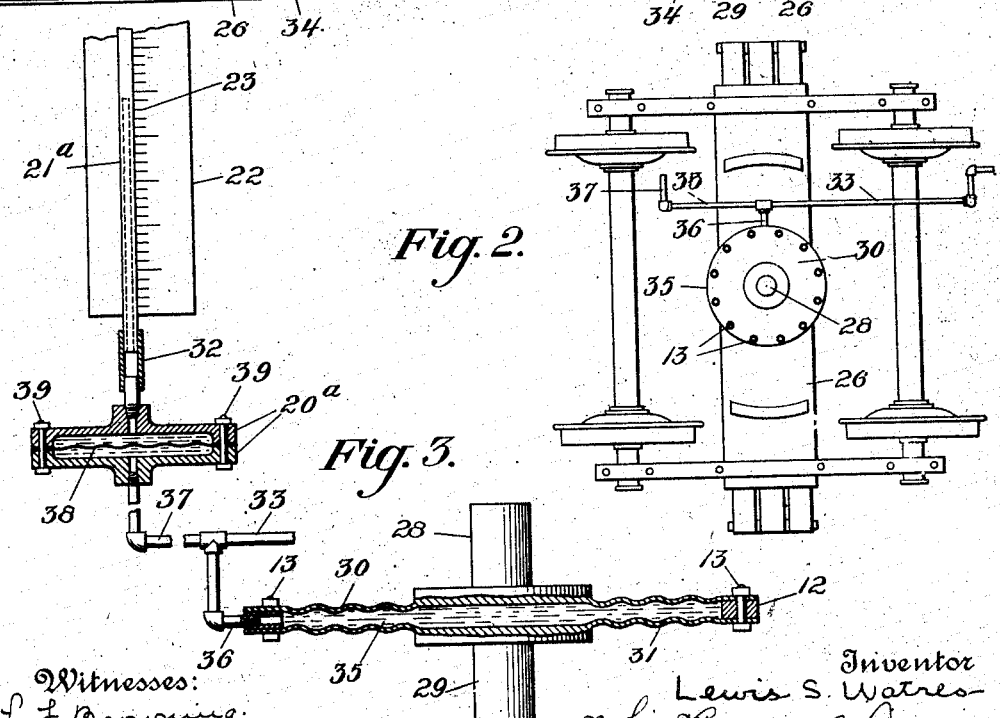
Fig. 2.
Fig. 3.
Witnesses:
L. F. Browning.
F. Meissner.
Inventor
Lewis S. Watres
By his Attorney
Edward C. Davidson

UNITED STATES PATENT OFFICE.

LEWIS S. WATRES, OF SCRANTON, PENNSYLVANIA, ASSIGNOR OF FORTY ONE-HUNDREDTHS TO CLARENCE D. SIMPSON AND TWENTY ONE-HUNDREDTHS TO HENRY H. BRADY, BOTH OF SCRANTON, PENNSYLVANIA.

MEANS FOR DETERMINING THE WEIGHT OF FUEL CARRIED BY A LOCOMOTIVE-TENDER.

1,136,634.

Specification of Letters Patent.

Patented Apr. 20, 1915.

Original application filed May 16, 1913, Serial No. 767,997. Divided and this application filed November 7, 1913. Serial No. 799,755.

*To all whom it may concern:*

Be it known that I, LEWIS S. WATRES, a citizen of the United States, residing in Scranton, in the county of Lackawanna, State of Pennsylvania, have invented a certain new and useful Means for Determining the Weight of Fuel Carried by a Locomotive-Tender, of which the following is a specification.

The invention of this application is a division of an application filed by me May 16, 1913 under Serial No. 767,997, and consists of an organization by which variations in the weight of the fuel carried by the tender of a locomotive may be readily determined by a suitable indicating device, actuated by a closed liquid system, under control of operating means forming a part of the king bolts of the car body and truck connections.

In the accompanying drawings: Figure 1 is a side elevation partly in section showing the lower part of a tender and its means of support on the truck bolsters. Fig. 2 is a plan view of one of the trucks showing the specially constructed king bolt, and: Fig. 3 is a detached view of the parts constituting the weighing apparatus.

The tender 1 with its body bolsters 24, 24, the trucks 34, 34, and truck bolsters 26, 26, are of ordinary construction. Each king bolt is divided into two parts, having interposed between them a yielding liquid container 35, consisting of a diaphragm 30, to the central part of which is secured the upper part 28 of the king bolt, a diaphragm 31, to which is secured the lower part 29 of the king bolt, a spacing ring 12, between the diaphragms at their peripheries, and bolts and nuts 13, for holding the parts of the liquid containers together. The upper part 28 of the king bolt seats in a socket 25 on a truck bolster and the lower part 29 seats in a socket 25ª on the bolster of a truck. A pipe line 33 longitudinally arranged connects the liquid containers together by nipples 36, which extend from the spacing rings 13, and this pipe line by a transverse section 37 connects with the weight indicating device, which is carried at a suitable place on the tender. This weight indicating device consists of a two part casing 20ª with a diaphragm 38 interposed between them, the whole firmly secured together by bolts 39. A closed liquid system is thus provided, composed of the liquid containers 35 of the king bolts, the chamber of the casing 20ª beneath the diaphragm 38 and the connecting pipes. The liquid in this closed system should be such as to be unaffected by ordinary low temperature and preferably non-compressible, as, for instance, it may be mercury, alcohol, kerosene, etc.

All of the diaphragms will be made of a suitable yielding material, as steel, of a strength adequate to the work they are submitted to. They are preferably corrugated, as shown, to increase their capacity for compression and reaction.

The diaphragm 38 of the gage may be provided with means to actuate any style of weight indicating device. That shown at Fig. 3 is the preferred style. It consists of a gage tube 21ª held in a flexible connection 32 projecting upwardly from the upper half of the casing 20ª, and a plate 22, provided with a scale 23, which may be calibrated to indicate only the weight of the coal carried in the tender,—the indications being read by the position of the surface of a column of liquid in the tube, said liquid filling the upper chamber of the casing 20ª above the diaphragm 38, its height in the tube being determined by the pressure caused to bear on the diaphragm 38, corresponding to the capacities of the liquid containers 35, as changed by variations of load carried by the tender.

The scale plate 22 to which the gage tube 21ª is held may be secured to any suitable part of the walls of the tender and may be protected from injury, etc. by a suitable casing.

While I have shown both diaphragms of the liquid containers 35 corrugated, and deem that arrangement the most efficient, it is not in fact necessary. A rigid plate may be substituted for one of them. The upper diaphragm 30 of the liquid container 35 may be secured to a plate which is secured to the bolster 24 of the truck, the other parts of the king bolt and liquid retainer being as shown. This construction will require less space between the bolster and truck than that shown in the drawings.

I claim:

1. A locomotive tender having combined with it and interposed between it and its carrying trucks a closed liquid system comprising a liquid container and having one or more diaphragms acting as a support for the tender body, and king bolts secured to the liquid containers whereby variations of load may be indicated by a gage controlled by the liquid in the closed system.

2. The combination with a locomotive tender and its carrying trucks of king bolts having mediate their ends yielding liquid containers, a gage casing and pipes connecting the containers and gage casing constituting a closed liquid system, whereby variations of pressure upon the liquid in the containers due to variations of load of fuel carried by the tender may be indicated by corresponding changes of pressure in the gage casing.

3. The combination with a locomotive tender and its carrying trucks of king bolts having mediate their ends yielding liquid containers, a gage casing divided by a diaphragm, pipes connecting the containers and one side of the gage casing constituting a closed liquid system, and a gage tube extending from the other side of the gage casing, whereby variations of pressure upon the liquid in the containers due to variations of load of fuel carried by the tender may be indicated by corresponding changes of pressure in the gage casing.

In testimony whereof, I have hereunto subscribed my name.

LEWIS S. WATRES.

Witnesses:
ALBERT L. WATSON,
C. D. SIMPSON.